United States Patent
Franz

(10) Patent No.: US 7,656,944 B2
(45) Date of Patent: Feb. 2, 2010

(54) RECEIVER FOR AN OPTICAL SIGNAL

(75) Inventor: Bernd Franz, Brackenheim (DE)

(73) Assignee: Alcatel, Paris (FR)

( * ) Notice: Subject to any disclaimer, the term of this patent is extended or adjusted under 35 U.S.C. 154(b) by 502 days.

(21) Appl. No.: 11/485,297

(22) Filed: Jul. 13, 2006

(65) Prior Publication Data

US 2007/0030891 A1 Feb. 8, 2007

(30) Foreign Application Priority Data

Aug. 2, 2005 (EP) .................... 05291661

(51) Int. Cl.
*H03H 7/30* (2006.01)
*H03H 7/40* (2006.01)
*H03K 5/159* (2006.01)

(52) U.S. Cl. .................. 375/233; 375/229; 375/232

(58) Field of Classification Search .......... 375/229–236
See application file for complete search history.

(56) References Cited

U.S. PATENT DOCUMENTS

2002/0060820 A1 5/2002 Buchali

2003/0011847 A1* 1/2003 Dai et al. ............. 359/161
2005/0008070 A1* 1/2005 Wang et al. ............ 375/232

* cited by examiner

*Primary Examiner*—Curtis B Odom
(74) *Attorney, Agent, or Firm*—Carmen Patti Law Group, LLC

(57) ABSTRACT

A receiver for an optical signal is described. The receiver comprises a decision feedback equalizer (DFE), wherein a distorted input signal (DIS) being derived from the optical signal, as well as a first threshold signal (Th1) and/or a first coefficient (Coeff1) are provided to the decision feedback equalizer (DFE), and wherein an error signal (ES1) is provided by the decision feedback equalizer (DFE). The receiver comprises a control unit (CU), wherein the error signal (ES1) is provided to the control unit (CU), and wherein the first threshold signal (Th1) and/or the first coefficient (Coeff1) are adapted by the control unit (CU). The receiver comprises an eye monitor (EM) for optimizing the adapted first threshold signal (Th1) and/or the adapted first coefficient (Coeff1), wherein the distorted input signal (DIS) is provided to the eye monitor (EM).

8 Claims, 2 Drawing Sheets

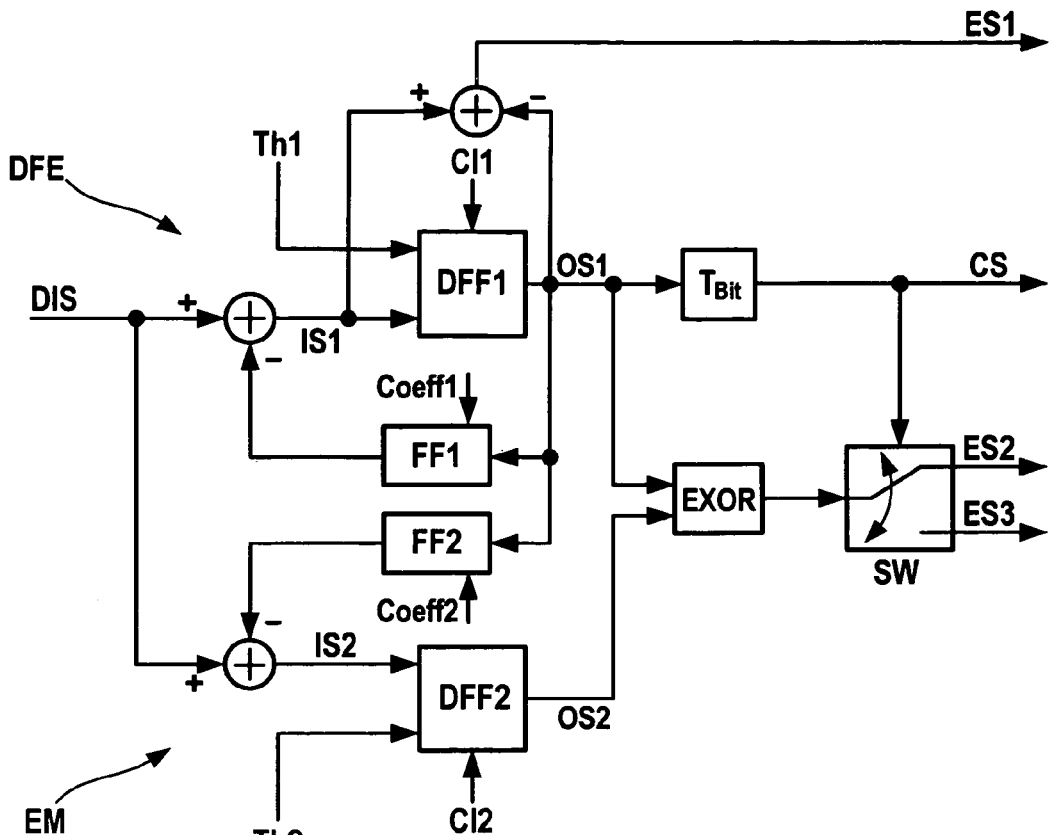
Fig. 1
Fig. 2
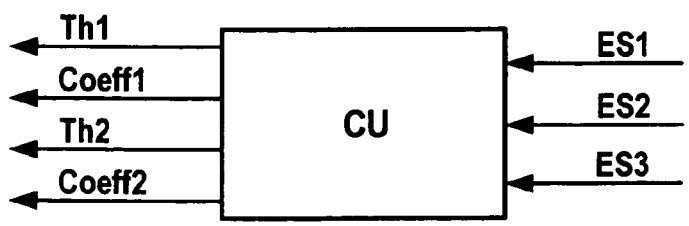

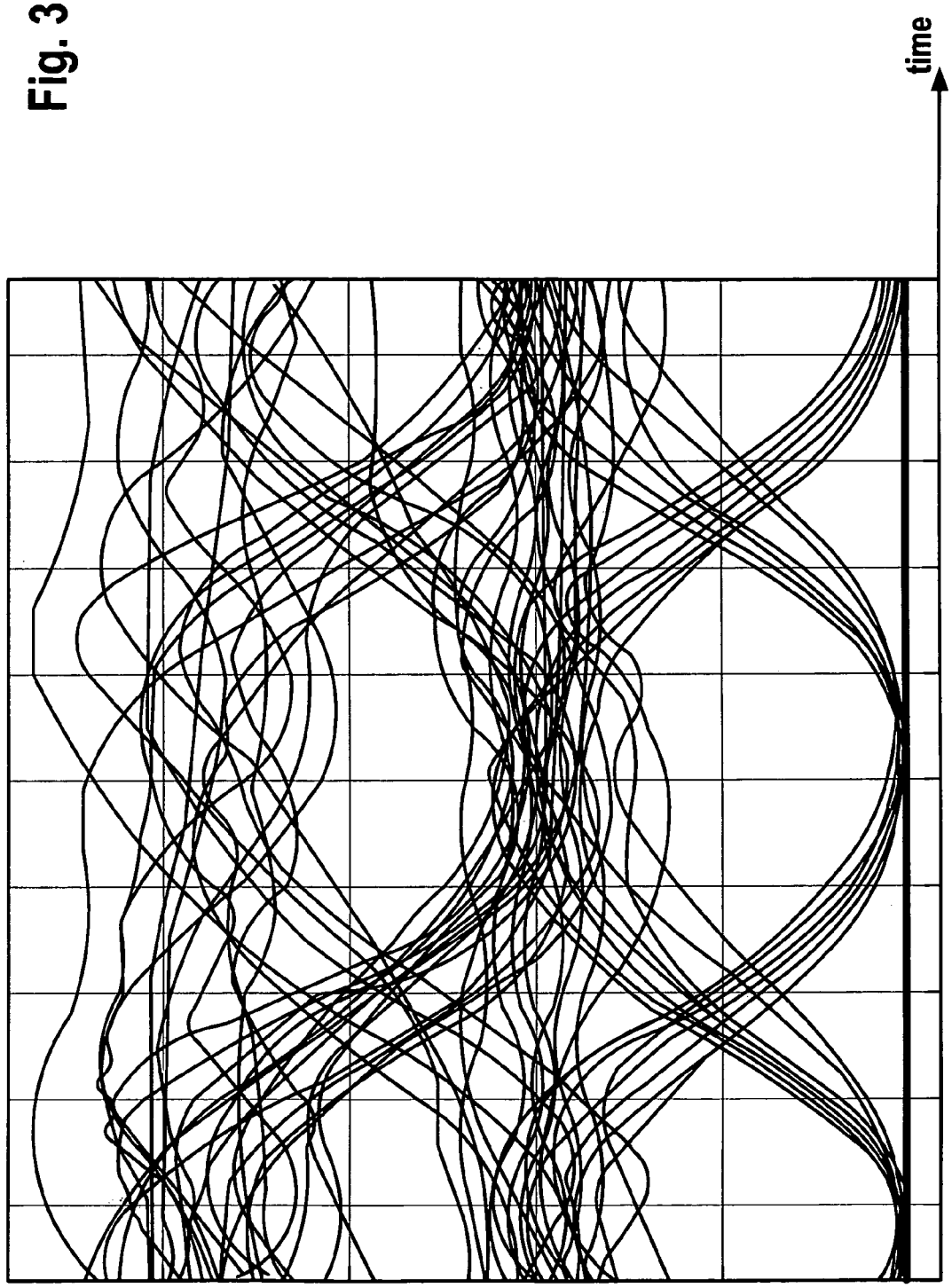

RECEIVER FOR AN OPTICAL SIGNAL

The invention is based on a priority application EP 05291661.6 which is hereby incorporated by reference.

BACKGROUND OF THE INVENTION

The invention relates in general to optical communication systems and in particular to a receiver for an optical signal.

It is known that signal dispersion, for example polarization mode dispersion, is one of a number of limiting criterion in connection with optical communication systems, in particular in connection with fiber optical transmission links. Successive digital pulses are smeared along the optical link so that they are no longer distinguishable as well-defined pulses at a receiver. Instead, the pulses overlap what leads to a distorted optical signal with so-called inter-symbol interferences.

It is also known that a decision feedback equalizer can be used in the receiver to eliminate the inter-symbol interferences. For that purpose, the decision feedback equalizer may comprise a feedforward filter and a feedback filter comprising one or more taps, respectively, and a detector. The feedforward filter receives the distorted signal and the detector generates a corrected output signal. This output signal is input to the feedback filter and the difference between the outputs of the feedforward filter and the feedback filter is input to the detector. The two filters may be implemented as finite impulse response filters with adjustable coefficients. For adaptation purposes, these coefficients may be improved e.g. with a last mean square (LMS) algorithm. Reference is made to "John. G. Proakis: Channel Equalization, in J. D. Gibson: The Communication Handbook, CRC press/IEEE press, pages 339 to 363.

However, the known algorithms do not provide an optimum adaptation so that a resulting bit error rate is not minimized.

Furthermore, it is known to combine a decision feedback equalizer and an eye monitor in order to improve the elimination of inter-signal interferences. An example of this combination is disclosed in U.S. 2002/0060820 A1. There, in connection with FIG. 3, a digital decision feedback equalizer is described that consists of two decision elements being connected in parallel wherein the outputs of these decision elements are connected to a switch. The decision elements may be implemented as decision flip-flops. As it is also shown in FIG. 3, two eye monitors are present being connected in parallel and wherein each one comprises a further decision flip-flop.

The incoming distorted signal, therefore, is forwarded to four decision flip-flops. Due to the electrical input circuits of these four decision flip-flops, the distorted signal becomes even more corrupted and the bit error rate increases.

SUMMARY OF THE INVENTION

It is an object of the invention to provide a receiver for an optical signal with a minimized bit error rate.

The invention solves this object by a receiver for an optical signal comprising: a decision feedback equalizer, wherein a distorted input signal being derived from the optical signal, as well as a first threshold signal and/or a first coefficient are provided to the decision feedback equalizer, and wherein an error signal is provided by the decision feedback equalizer, a control unit, wherein the error signal is provided to the control unit, and wherein the first threshold signal and/or the first coefficient are adapted by the control unit, and an eye monitor for optimizing the adapted first threshold signal and/or the adapted first coefficient, wherein the distorted input signal is provided to the eye monitor.

The invention provides a decision feedback equalizer wherein a distorted input signal that is derived from the optical signal, as well as a first threshold signal and/or a first coefficient are provided to the decision feedback equalizer. The purpose of the decision feedback equalizer is to adapt the first threshold signal and/or the first coefficient, in particular during a start-up procedure of the receiver. Furthermore, the invention provides an eye monitor to which the distorted input signal is provided. The eye monitor has the purpose to optimize the adapted first threshold signal and/or the adapted first coefficient, in particular after the start-up procedure.

One advantage of the invention is the fact that the eye monitor allows a "fine-tuning" of the adapted threshold signal and/or the adapted coefficient. This optimization results in a minimized bit error rate and thereby in an improved receiver.

Another advantage of the invention is the fact that only a minimum number of decision flip-flops are necessary to implement the decision feedback equalizer and the eye monitor. In particular, only two decision flip-flops are used to realize the receiver. This minimum number of decision flip-flops does not further increase the corruption of the distorted input signal. This advantage becomes even more apparent if a decision feedback equalizer with more than one tap is regarded.

Another advantage of the invention is the fact that no forward error correction is necessary for obtaining an error signal required for the adaptation of the threshold signal and/or the coefficient signal. This reduces the number of electrical circuits of the receiver resulting in an improved of the bit error rate.

In an advantageous embodiment of the invention, a control unit is provided for influencing the first threshold signal and/or the first coefficient depending on the outputs of the decision feedback equalizer and the eye monitor. The control unit allows to implement given schemes for the generation of the first threshold signal and/or the first coefficient. In particular, different schemes may be used for an upper eye and a lower eye of an eye diagram of the eye monitor. Thereby, it is possible to optimize the generation of the first threshold signal and/or the first coefficient depending on the upper or lower eye.

BRIEF DESCRIPTION OF THE DRAWINGS

Further features, applications and advantages of the invention will become apparent from the following description of exemplary embodiments of the invention that are shown in the drawings. There, all described and shown features separately or in any combination represent the subject matter of the invention, independently of the wording in the description or the representation in the drawings and independently of the combination of the features in the claims or the dependencies of the claims.

FIG. 1 shows a schematic block diagram of an embodiment of a decision feedback equalizer and an eye monitor of a receiver for an optical signal according to the invention, FIG. 2 shows a schematic block diagram of another electrical circuit of the receiver shown in FIG. 1, and FIG. 3 shows an example of a schematic eye diagram of the eye monitor of FIG. 1.

DETAILED DESCRIPTION OF THE INVENTION

FIGS. 1 and 2 show parts of a receiver for an optical signal. In addition to the shown electrical circuits, the receiver comprises an opto-electrical converter that is connected to a fiber on which the optical signal is transmitted. Originally, the optical signal is generated as a binary signal. However, due to signal dispersion, the optical signal becomes distorted on its transmission along the fiber. The converter then receives the distorted optical signal and converts it into an electrical signal. The generated electrical signal is distorted, too, and is hereinafter called distorted input signal DIS.

According to FIG. 1, a first decision flip-flop DFF1 is provided that is part of a decision feedback equalizer DFE. The first decision flip-flop DFF1 may be adjusted by a first threshold signal Th1. As well, a first clock phase Cl1 is provided to the first decision flip-flop DFF1. The first decision flip-flop DFF1 generates a first output signal OS1 that is input to a first feedback filter FF1. The first feedback filter FF1 may be adjusted by a first coefficient Coeff1. The output of the first feedback filter FF1 is subtracted from the distorted input signal DIS resulting in a first input signal IS1 for the first decision flip-flop DFF1.

The first input signal IS1 and the first output signal OS1 of the first decision flip-flop DFF1 are subtracted from each other resulting in a first error signal ES1.

According to FIG. 1, a second decision flip-flop DFF2 is provided that is part of an eye monitor EM. The second decision flip-flop DFF2 may be adjusted by a second threshold signal Th2. As well, a second clock phase Cl2 is provided to the second decision flip-flop DFF2. The first output signal OS1 of the first decision flip-flop DFF1 is input to a second feedback filter FF2 that may be adjusted by a second coefficient Coeff2. The output of the second feedback filter FF2 is subtracted from the distorted input signal DIS resulting in a second input signal IS2 for the second decision flip-flop DFF2. The second decision flip-flop DFF2 generates a second output signal OS2.

The first output signal OS1 of the first decision flip-flop DFF1 and the second output signal OS2 of the second decision flip-flop DFF2 are input to an EXOR-gate that carries out an exclusive OR function based on its two input signals. The output of the EXOR-gate is forwarded to an electric switch SW having two outputs where a second and a third error signal ES2, ES3 are present.

According to FIG. 1, a control signal CS is generated by a delay gate $T_{Bit}$ that delays the first output signal OS1 coming from the first decision flip-flop DFF1, by the time duration of one binary digit. The position of the switch SW is controlled by the state of the control signal CS.

As shown in FIG. 2, the receiver comprises a control unit CU that receives the first, second and third error signal ES1, ES2, ES3, respectively. The control unit CU may comprise a signal processor for processing these input signals. Based on programmed schemes, the control unit generates the first and second threshold signal Th1, Th2 as well as the first and second coefficient Coeff1, Coeff2, respectively. In addition, further input signals may be provided to the control unit CU, for example the control signal CS. As well, the control unit CU may generate further output signals, for example the first and second clock phase Cl1, Cl2, respectively.

The receiver as described above in connection with FIGS. 1 and 2 functions as follows:

At a start-up of the receiver, rough estimates of the first threshold signal Th1 and the first coefficient Coeff1 are selected by the control unit CU. These estimates are forwarded to the first decision flip-flop DFF1 and the first feedback filter FF1. Then, during the start-up of the receiver, the distorted input signal DIS is received and the first error signal ES1 is generated and forwarded to the control unit CU. The first error signal ES1 is used by the control unit CU to carry out a last mean square (LMS) algorithm in order to adapt the selected estimates of the first threshold signal Th1 and the first coefficient Coeff1. This start-up procedure is continued in particular until the eye diagram of the eye monitor EM is opened.

During normal operation of the receiver, i.e. after the start-up of the receiver, the control unit CU dithers the second threshold signal Th2 and the second coefficient Coeff2 around respective mean values, in particular around the first threshold signal Th1 and the first coefficient Coeff1. These dithering signals are forwarded to the second decision flip-flop DFF2 and the second feedback filter FF2. Furthermore, the distorted input signal DIS is received by the first and the second decision flip-flop DFF1, DFF2 and the first, second and third error signals ES1, ES2, ES3 are generated and forwarded to the control unit CU. The second and the third error signals ES2, ES3 are used by the control unit CU to generate the first threshold signal Th1 and the first coefficient Coeff1. The first error signal ES1 is not used anymore in this connection.

During this normal operation of the receiver, the first output signal OS1 of the first decision flip-flop DFF1 is delayed by the time duration of one binary digit by the delay gate $T_{Bit}$. As a result, the control signal CS always corresponds to the preceding binary digit of the first output signal OS1. The switch SW, therefore, is switched back and forth depending on the preceding binary digit of the first output signal OS1.

Furthermore, during normal operation, the first and the second output signals OS1, OS2 of the first and the second decision flip-flop DFF1, DFF2 are compared by the EXOR-gate. The resulting output signal indicates different binary digits of the first and the second output signals OS1, OS2. This resulting output signal is then forwarded as the second error signal ES2 or the third error signal ES3, depending on the position of the switch SW and therefore depending on the preceding binary digit of the first output signal OS1.

FIG. 3 shows an eye diagram of the eye monitor EM as described above in connection with the receiver of FIG. 1. The values of the eye diagram of FIG. 3 are depicted over the time.

The eye diagram of FIG. 3 comprises an upper eye and a lower eye. The selection of one of these eyes is carried out depending on the preceding binary digit of the first output signal OS1. If the first output signal OS1 is a digital "1", then the upper eye of the eye diagram of FIG. 3 is used in connection with the next binary digit. However, if the first output signal OS1 is a digital "0", then the lower eye of the eye diagram of FIG. 3 is used in connection with the next binary digit.

With the help of the switch SW and the delay gate $T_{Bit}$, therefore, the upper or the lower eye of the eye diagram of FIG. 3 is selected in connection with every binary digit of the first output signal OS1.

As can be seen from the eye diagram of FIG. 3, the upper eye and the lower eye provide a vertical eye opening and a horizontal eye opening, respectively. Both eye openings should be a maximum value in order to gain a minimized bit error rate. However, due to the described signal dispersion, the eye openings vary and in particular decrease. By influencing for example the first and second threshold signals Th1, Th2 and/or the first and second coefficients Coeff1, Coeff2, the receiver is influenced in order to adapt to the varying eye openings and thereby to decrease the bit error rate.

By definition, the upper and the lower eye of the eye diagram relate to the second and the third error signals ES2, ES3, respectively.

As can also be seen from FIG. 3, the upper eye often includes more noise than the lower eye. The control unit CU, therefore, processes the second and the third error signal ES2, ES3 differently. For example, the second error signal ES2 may have an influence on the first threshold signal Th1 and the first coefficient Coeff1, whereas the third error signal ES3 may only have an influence on the first threshold signal Th1 with the first coefficient Coeff1 remaining unchanged, e.g. being zero.

If the switch SW selects one of the second or the third error signals ES2, ES3, the respective non-selected error signal is not considered but is set into a hold state. The selected error signal, however, influences the first threshold signal Th1 and/or the first coefficient Coeff1 and thereby the vertical eye opening of the respective upper or lower eye.

The first and second clock phases Cl1, Cl2 may be selected to given values, for example by the control unit CU. As well, it is possible to dither the second clock phase Cl2 in order to measure the horizontal eye opening. Then, the first clock phase Cl1 may be adapted in order to influence the horizontal eye opening.

In an alternative embodiment, the switch SW and the generation of the control signal CS are not present. In this case, the first threshold signal Th1 and/or the first coefficient Coeff1 are influenced directly by that signal provided at the output of the EXOR-gate without differentiating between the upper and the lower eye of the eye diagram of FIG. 3.

In further alternative embodiments, the decision feedback equalizer DFE may comprise not only one tap, but a number of taps.

The receiver shown in FIGS. 1 and 2, therefore, comprises the decision feedback equalizer DFE and the eye monitor EM. The decision feedback equalizer DFE adapts the first threshold signal Th1 and/or the first coefficient Coeff1 with the help of an algorithm. The first threshold signal Th1 and/or the first coefficient Coeff1 are continuously optimized with the help of the eye monitor EM. Thereby, the vertical and/or horizontal eye opening of the corresponding eye diagram are maximized so that the bit error rate becomes a minimum.

The invention claimed is:

1. A receiver for an optical signal comprising: a decision feedback equalizer, wherein a distorted input signal being derived from the optical signal, as well as a first threshold signal and/or a first coefficient are provided to the decision feedback equalizer, and wherein an error signal is provided by the decision feedback equalizer, a control unit, wherein the error signal is provided to the control unit, and wherein the first threshold signal and/or the first coefficient are adapted by the control unit, and an eye monitor for optimizing the adapted first threshold signal and/or the adapted first coefficient, wherein the distorted input signal is provided to the eye monitor.

2. The receiver of claim 1 wherein the decision feedback equalizer comprises: a first decision flip-flop and a first feedback filter, wherein a first output signal is generated by the first decision flip-flop, wherein the first output signal is forwarded via the first feedback filter and is then combined with the distorted input signal resulting in a first input signal, wherein the first input signal is provided to the first decision flip-flop, wherein the first threshold signal is provided to the first decision flip-flop and/or wherein the first coefficient is provided to the first feedback filter, and wherein the first input signal and the first output signal are combined resulting in the first error signal that is used to adapt the first threshold signal and/or the first coefficient.

3. The receiver of claim 1 wherein the eye monitor comprises: a second decision flip-flop and a second feedback filter, wherein a first output signal of the decision feedback equalizer is forwarded via the second feedback filter and is then combined with the distorted input signal resulting in a second input signal, and wherein a second output signal is provided by the second decision flip-flop.

4. The receiver of claim 3 wherein the first output signal and the second output signal are provided to an EXOR-gate, and wherein an output signal is generated by the EXOR-gate.

5. The receiver of claim 3 wherein a second threshold signal is provided to the second decision flip-flop and/or wherein a second coefficient is provided to the second feedback filter, and wherein the second threshold and/or the second coefficient are/is dithered around a mean value.

6. The receiver of claim 4 wherein the first error signal and the output signal of the EXOR-gate are provided to the control unit, and wherein the first threshold signal and/or the first coefficient are generated by the control unit depending on the first error signal or depending on the output signal of the EXOR-gate.

7. The receiver of claim 6 wherein the first threshold signal and/or the first coefficient are generated depending on the first error signal during a start-up procedure of the receiver, and wherein the first threshold signal and/or the first coefficient are generated depending on the output signal of the EXOR-gate after the start-up procedure.

8. The receiver of claim 4 wherein the output signal of the EXOR-gate is provided as a second error signal or a third error signal depending on the preceding binary digit of the first output signal, and wherein the second and the third error signals are provided to the control unit and are processed differently by the control unit.

* * * * *

UNITED STATES PATENT AND TRADEMARK OFFICE
CERTIFICATE OF CORRECTION

PATENT NO.      : 7,656,944 B2                                                Page 1 of 1
APPLICATION NO. : 11/485297
DATED           : February 2, 2010
INVENTOR(S)     : Bernd Franz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-eighth Day of December, 2010

David J. Kappos
*Director of the United States Patent and Trademark Office*